United States Patent
Tian

(10) Patent No.: US 9,696,827 B2
(45) Date of Patent: Jul. 4, 2017

(54) TRIGGERING METHOD AND WIRELESS HANDHELD DEVICE

(71) Applicant: HUAWEI DEVICE CO., LTD., Shenzhen (CN)

(72) Inventor: Jing Tian, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 10 days.

(21) Appl. No.: 14/097,407

(22) Filed: Dec. 5, 2013

(65) Prior Publication Data

US 2014/0092046 A1 Apr. 3, 2014

Related U.S. Application Data

(63) Continuation of application No. PCT/CN2011/075620, filed on Jun. 10, 2011.

(51) Int. Cl.
G06F 3/041 (2006.01)
G06F 3/0488 (2013.01)
H04M 1/673 (2006.01)

(52) U.S. Cl.
CPC .......... *G06F 3/041* (2013.01); *G06F 3/04883* (2013.01); *H04M 1/673* (2013.01); H04M 2250/22 (2013.01)

(58) Field of Classification Search
CPC ......... G06F 3/0488; G06F 2203/04104; G06F 2203/04105; G06F 3/017; G06F 3/0487;
(Continued)

(56) References Cited

U.S. PATENT DOCUMENTS

2002/0078393 A1* 6/2002 Parker .................. G06F 1/1626 713/324
2008/0055276 A1* 3/2008 Chang .......................... 345/175
(Continued)

FOREIGN PATENT DOCUMENTS

CN 101192256 6/2008
CN 101441548 5/2009
(Continued)

OTHER PUBLICATIONS

Extended and Supplementary European Search Report issued on Oct. 16, 2014 in corresponding European Patent Application No. 11789251.3.
(Continued)

*Primary Examiner* — Stephen Sherman
(74) *Attorney, Agent, or Firm* — Staas & Halsey LLP

(57) ABSTRACT

A triggering method and a wireless handheld device provided in embodiments of the present invention relate to the field of electronic technologies. The touchscreen triggering method includes: detecting an input combination that is of a click frequency and/or click intensity and is received when a touchscreen is in a locked state; and when it is detected that the input combination that is of the click frequency and/or the click intensity and is received when the touchscreen is in the locked state matches a pre-stored input combination of a click frequency and/or click intensity, wherein the pre-stored input combination of the click frequency and/or the click intensity is corresponding to an operation, executing the operation corresponding to the matched pre-stored input combination of the click frequency and/or the click intensity.

5 Claims, 3 Drawing Sheets

(58) Field of Classification Search
CPC ... G06F 2200/1636; G06F 2203/04808; G06F 3/041; G06F 3/04883; H04M 1/673; H04M 2250/22
USPC .......................................................... 345/173
See application file for complete search history.

(56) References Cited

U.S. PATENT DOCUMENTS

| | | |
|---|---|---|
| 2008/0117188 A1 | 5/2008 | Ko et al. |
| 2010/0099394 A1* | 4/2010 | Hainzl ........................... 455/418 |
| 2010/0162182 A1* | 6/2010 | Oh ...................... G06F 3/04883 715/863 |
| 2011/0294467 A1* | 12/2011 | Kim et al. .................... 455/411 |
| 2012/0108166 A1* | 5/2012 | Hymel ......................... 455/26.1 |
| 2015/0040211 A1* | 2/2015 | Lee et al. ......................... 726/16 |

FOREIGN PATENT DOCUMENTS

| | | |
|---|---|---|
| CN | 102203705 | 9/2011 |
| EP | 2 144 148 A2 | 1/2010 |
| TW | 201017476 | 5/2010 |

OTHER PUBLICATIONS

International Search Report issued on Mar. 22, 2012 in corresponding International Application No. PCT/CN2011/075620.
Chinese Notice of Allowance dated Feb. 5, 2015 in corresponding Chinese Patent Application No. 201180000691.X.

* cited by examiner

TRIGGERING METHOD AND WIRELESS HANDHELD DEVICE

CROSS-REFERENCE TO RELATED APPLICATIONS

This application is a continuation of international Application No. PCT/CN2011/075620, filed on Jun. 10, 2011, which is hereby incorporated by reference in its entirety.

TECHNICAL FIELD

The present invention relates to the field of electronic technologies, and in particular, to a triggering method and a wireless handheld device.

BACKGROUND

With development trends of facilitation and miniaturization of wireless handheld devices, higher requirements are imposed on input configuration of the wireless handheld devices. As an input device that occupies small space and is convenient to use, a touchscreen is widely applied.

In a wireless handheld device having a touchscreen, physical coordinates of a touch on a screen are analyzed, and then a corresponding program is started or corresponding processing is performed. That is, a virtual keyboard or a menu is generally set in a touchscreen, and an operator generates touch input by touching or pressing a keyboard button on the virtual keyboard or a menu button on the menu.

However, in a practical application, in a dark ambient environment or in a case of emergency, a touchscreen user may fail to perform effective touch input on a wireless handheld device whose touchscreen is in a locked state; as a result, a related function cannot be operated in time, so that it is inconvenient to use.

SUMMARY

Embodiments of the present invention provide a triggering method and a wireless handheld device, so as to solve a problem that in a dark environment or in case of emergency, effective touch input cannot be performed on a wireless handheld device whose touchscreen is in a locked state.

In order to achieve the foregoing objectives, the embodiments of the present invention adopt the following technical solutions:

In one aspect, a touchscreen triggering method is provided and includes:

detecting an input combination that is of a click frequency and/or click intensity and is received when a touchscreen is in a locked state; and when it is detected that the input combination that is of the click frequency and/or the click intensity and is received when the touchscreen is in the locked state matches a pre-stored input combination of a click frequency and/or click intensity, where the pre-stored input combination of the click frequency and/or the click intensity is corresponding to an operation, executing the operation corresponding to the matched pre-stored input combination of the click frequency and/or the click intensity.

In one aspect, a wireless handheld device is provided and includes:

a touchscreen, configured to receive a click operation;

a detecting unit, configured to detect an input combination that is of a click frequency and/or click intensity and is received when the touchscreen is in a locked state;

a determining unit, configured to determine whether the input combination that is of the click frequency and/or the click intensity, is received when the touchscreen is in the locked state, and is detected by the detecting unit matches a pre-stored input combination of a click frequency and/or click intensity, where the pre-stored input combination of the click frequency and/or the click intensity is corresponding to an operation; and an executing unit, configured to, when the determining unit determines that the matching succeeds, execute the operation corresponding to the pre-stored input combination that is of the click frequency and/or the click intensity and is matched by the determining unit.

In one aspect, a wireless handheld device is provided and includes:

a touchscreen; and at least one processor, coupled to the touchscreen, where the processor is configured to detect an input combination that is of a click frequency and/or click intensity and is received when the touchscreen is in a locked state; and when it is detected that the input combination that is of the click frequency and/or the click intensity and is received when the touchscreen is in the locked state matches a pre-stored input combination of a click frequency and/or click intensity, where the pre-stored input combination of the click frequency and/or the click intensity is corresponding to an operation, execute the operation corresponding to the matched pre-stored input combination of the click frequency and/or the click intensity.

With the triggering method and the wireless handheld device provided in the embodiments of the present invention, an input combination that is of a click frequency and/or click intensity and is received when a touchscreen is in a locked state is detected; and when it is detected that the received input combination of the click frequency and/or the click intensity matches a pre-stored input combination of a click frequency and/or click intensity, where the pre-stored input combination of the click frequency and/or the click intensity is corresponding to an operation, the operation corresponding to the matched pre-stored input combination of the click frequency and/or the click intensity is executed. In this way, a related operation is executed according to a click frequency and/or click intensity, and it no longer needs to perform precise touch input on a virtual keyboard or a virtual button of a touchscreen. Therefore, even in a dark environment or in a case of emergency, effective touch input can still be performed on a wireless handheld device whose touchscreen is in a locked state, so that it is greatly convenient for a user of the wireless handheld device.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
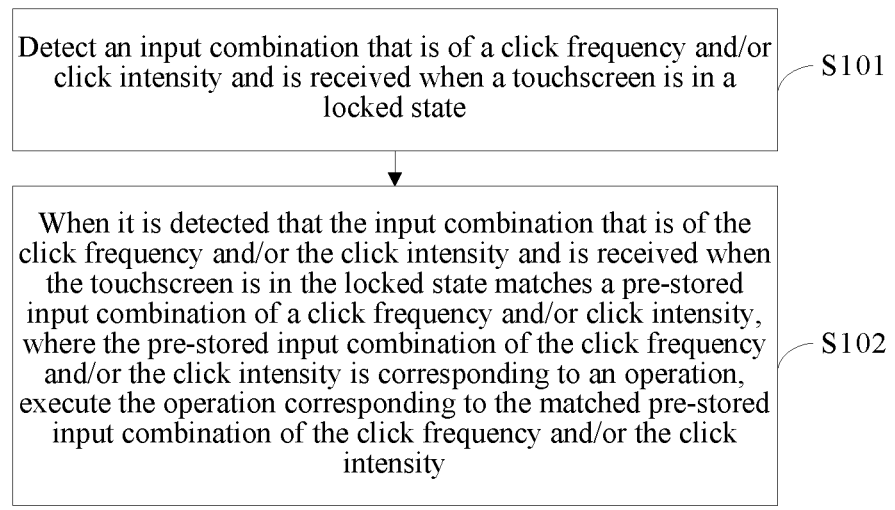
FIG. 1 is a schematic flow chart of a triggering method according to an embodiment of the present invention.

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

First, it should be noted that a wireless handheld device described in the embodiments of the present invention includes but is not limited to electronic devices capable of sending a short message such as mobile phones of different systems, smart phones based on different operating systems, personal digital assistants PDA.

Various embodiments of the present invention are described with reference to details discussed in the following, and the various embodiments are shown in the accompanying drawings. The following descriptions and drawings are used to describe the present invention, and should not be construed as a limitation to the present invention. Many details are described so as to provide a thorough understanding for the embodiments of the present invention. However, in some examples, well known or regular details are not described, so as to provide a brief discussion about the embodiments of the present invention.

Some of detailed descriptions in the following are presented in the form of algorithms, and these algorithms include operations of data stored in a computer memory. An algorithm is generally an operation sequence for obtaining an expected result. These operations usually require or involve physical manipulations on physical quantities. Usually (though not necessary), these quantities are in the forms of electric or magnetic signals that can be stored, transmitted, combined, compared, and manipulated in another manner. It has been proved that sometimes it is convenient to mention these signals as bits, values, elements, symbols, characters, items, numbers, and so on, which is mainly for the purpose of universality.

However, all these and similar terms will be associated with appropriate physical quantities, and only apply to conveniently marking these quantities. Unless obviously specified in the following discussions, it is acknowledged in the entire specification that the discussion about a term such as "process", "detect", "match", "start", "close", "unlock", "enter", "exit", "set", "pause", "determine", or "execute" may refer to an action or processing of a data processing system or a similar electronic device; and the data processing system or the electronic device manipulates data represented as physical (electronic) quantities in a register and a memory in the system, and converts the data to other data similarly represented as physical quantities in the memory or the register or other such information storage, transmission, or display devices in the system.

A touchscreen triggering method provided in an embodiment of the present invention is shown in FIG. 1, and the method includes:

S101: Detect an input combination that is of a click frequency and/or click intensity and is received when a touchscreen is in a locked state.

Herein, a processor or a corresponding module of a wireless handheld device detects an input combination that is of a click frequency and/or click intensity and is received when a touchscreen is in a locked state, which may be detecting an input combination that is of a click frequency and/or click intensity and is received at preset one or more positions when the touchscreen is in the locked state, or may be detecting an input combination that is of a click frequency and/or click intensity and is received at any one or more positions when the touchscreen is in the locked state.

It should be noted that the detecting an input combination that is of a click frequency and/or click intensity and is received when a touchscreen is in a locked state may be detecting a first click and a click frequency and/or click intensity of all clicks within preset time following the first click, and counting the detected first click and the detected click frequency and/or click intensity of the all clicks as one input combination of the click frequency and/or the click intensity, for example, if the preset time is 30 seconds, and 5 clicks are performed within 30 seconds following a first click on the touchscreen, a click frequency and/or click intensity of the 6 clicks is counted as one input combination of the click frequency and/or the click intensity.

S102: When it is detected that the input combination that is of the click frequency and/or the click intensity and is received when the touchscreen is in the locked state matches a pre-stored input combination of a click frequency and/or click intensity, where the pre-stored input combination of the click frequency and/or the click intensity is corresponding to an operation, execute the operation corresponding to the matched pre-stored input combination of the click frequency and/or the click intensity.

When the processor or the corresponding module of the wireless handheld device detects that the input combination that is of the click frequency and/or the click intensity and is received when the touchscreen is in the locked state matches a pre-stored input combination of a click frequency and/or click intensity, where the pre-stored input combination of the click frequency and/or the click intensity is corresponding to an operation, after unlocking the touchscreen, the processor or the corresponding module of the wireless handheld device starts a music player.

Herein, the pre-stored combination of the click frequency and/or click intensity may be a combination of a click frequency and/or a click intensity, where the combination of the click frequency and/or the click intensity is set and stored by a user and corresponding to a related operation, and may also be a combination of a click frequency and/or click intensity, where the combination of the click frequency and/or the click intensity is set and stored by a manufacturer of a wireless handheld device and corresponding to a related operation.

In addition, the operation corresponding to the input combination may include at least any one of the following: starting one or more application programs, pausing one or more application programs, closing one or more application programs, starting one or more menus, closing one or more menus, unlocking a touchscreen, entering one or more function interfaces, exiting one or more function interfaces, setting a parameter of a mobile phone, setting a mode of a mobile phone, setting a function of a mobile phone, and so on. For example, for a certain input combination, it may be starting a music playing function, or pausing a music playing function, or closing a music playing function, starting or closing an alarm clock, starting a camera or a video camera, starting or closing a radio, starting or closing a network connection, and so on; may also be starting a setting menu of a mobile phone or closing a setting menu of a mobile phone, and so on; and may also be entering a network selection interface or exiting a network selection interface, where setting a parameter of a mobile phone is, for example, setting a volume, an incoming call ringtone, and a notification ringtone of the mobile phone, and so on; setting a mode of a mobile phone is, for example, setting a silent mode, an airplane mode, or a normal mode, and so on; and setting a function of a mobile phone is, for example, starting or closing Bluetooth, starting or closing WIFI, and so on. A specific operation is not limited in this embodiment.

With the triggering method provided in the embodiment of the present invention, a wireless handheld device detects an input combination that is of a click frequency and/or click intensity and is received when a touchscreen is in a locked state; and when it is detected that the received input combination of the click frequency and/or the click intensity matches a pre-stored input combination of a click frequency and/or click intensity, where the pre-stored input combination of the click frequency and/or the click intensity is corresponding to an operation, executes the operation corresponding to the matched pre-stored input combination of the click frequency and/or the click intensity. In this way, a related operation is executed according to a click frequency and/or click intensity, and it no longer needs to perform precise touch input on a virtual keyboard or a virtual button of a touchscreen. Therefore, even in a dark environment or in case of emergency, effective touch input can still be performed on a wireless handheld device whose touchscreen is in a locked state, so that it is greatly convenient for a user of a touch apparatus.

A touchscreen triggering method provided in another embodiment of the present invention is described by taking that a user starts a music player of a mobile phone whose touchscreen is in a locked state as an example.

The user may preset and store a combination of a click frequency and click intensity, where the combination of the click frequency and the click intensity is corresponding to an operation such as "starting a music player".

For example, the user starts a touch learning function of the mobile phone. It is assumed that "three successive clicks are performed on the screen with the intensity of each click being medium" is set as an instruction combination for starting the music player. Then, after the user successively clicks a specified position of the screen three times with the intensity of each click being medium and selects "saving", the mobile phone pre-stores the combination of a click frequency and/or click intensity for starting the music player.

In addition, before a mobile phone leaves the factory, a manufacturer may pre-store a set combination of a click frequency and/or click intensity in the mobile phone, where the set combination of the click frequency and/or the click intensity is corresponding to a related operation (such as starting a music player). After that, a user learns and memorizes the combination in a manner of animations and text in a specification or mobile phone.

It should be noted that, in this embodiment, the user clicks a specified position of the screen when storing a touch instruction. However, in an actual application, for a mobile phone whose touchscreen is in a locked state, "three successive clicks on the screen with the intensity of each click being medium" may be performed at any position of the touchscreen. A touch position during actual input is not limited in this embodiment. That is, an input combination of a click frequency and/or click intensity may be performed at preset one or more positions; alternatively, an input combination of a click frequency and/or click intensity may be performed at any one or more positions.

It should be noted that, a pre-stored click frequency corresponding to the operation may be one or more numerical intervals; and pre-stored touchscreen clicking intensity corresponding to the operation may be one or more numerical intervals. That is, a set click frequency and set click intensity for clicking the touchscreen may be one or more numerical intervals rather than one or more very precise numerical values. For example, the set click frequency is not a precise interval such as 0.5 seconds, but may be set to an interval less than 1 second. If the click intensity needs to be set, the click intensity may be set to two levels, namely, "strong" and "weak", or three levels, namely, "strong", "medium", and "weak". Setting the click frequency and the click intensity for clicking the touchscreen to numerical intervals may increase a probability of matching and identification, so that a touch input success rate of a user is larger, and it is convenient for the user to use.

When the user needs to play music by starting a music player in a mobile phone, the user only needs to perform "three successive clicks with the intensity of each click being medium", and then the music player may be started to play music.

Figure 2:
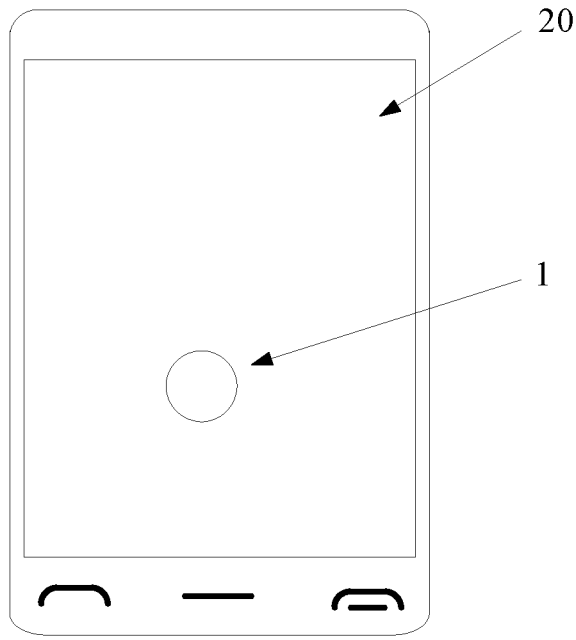
FIG. 2 is a schematic diagram of a touch position in a triggering method according to an embodiment of the present invention.

For example, the user may perform clicks in any region of a touchscreen. As shown in FIG. 2, the user may perform three successive clicks at any position of a touchscreen 20, such as a position 1, with the intensity of each click being medium. Then, a background matches the input combination with a pre-stored combination of a click frequency and click intensity. If the matching succeeds, the music player corresponding to the input combination is started to play music.

Figure 3:
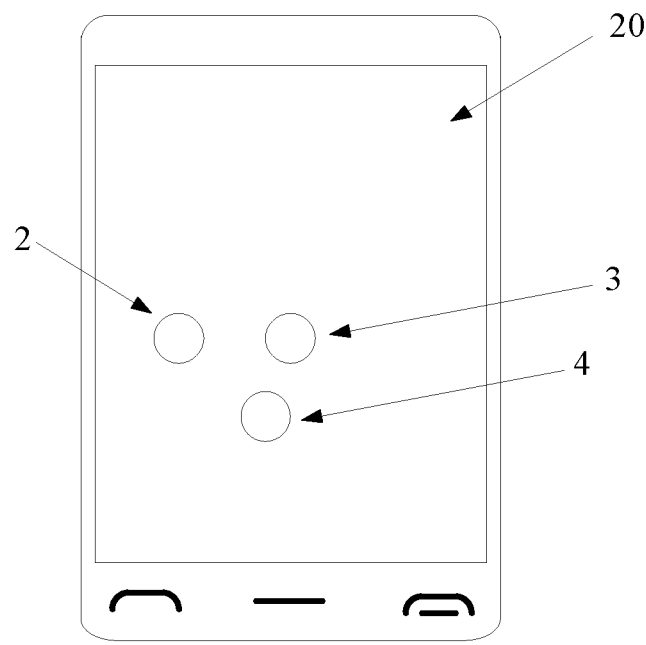
FIG. 3 is a schematic diagram of another touch position in a triggering method according to an embodiment of the present invention.

In addition, the user may perform clicks in different regions of the touchscreen. As shown in FIG. 3, the user performs three clicks at any three positions of the touchscreen 20, such as positions 2, 3, and 4, with the intensity of each click being medium. Then, the background matches the input combination with the pre-stored combination of the click frequency and click intensity. If the matching succeeds, the music player corresponding to the input combination is started to play music.

That is to say, no requirement may be imposed on a position where the user clicks the touchscreen, which is different from a case in the prior art that the user has to touch a specified position. In a dark ambient environment or in a case of emergency, a related operation can be performed quickly and a success rate is larger.

In addition, in this embodiment, starting the music player is taken as an example for description; however, this embodiment is not limited thereto, and other operations may also be performed, such as any one of the following: starting one or more application programs, pausing one or more application programs, closing one or more application programs, starting one or more menus, closing one or more menus, unlocking a touchscreen, entering one or more function interfaces, exiting one or more function interfaces, setting a parameter of a mobile phone, setting a mode of a mobile phone, setting a function of a mobile phone, and so on.

With the triggering method provided in the embodiment of the present invention, a wireless handheld device detects an input combination that is of a click frequency and/or click intensity and is received when a touchscreen is in a locked state; and when it is detected that the received input combination of the click frequency and/or the click intensity matches a pre-stored input combination of a click frequency and/or click intensity, where the pre-stored input combination of the click frequency and/or the click intensity is corresponding to an operation, executes the operation corresponding to the matched pre-stored input combination of the click frequency and/or the click intensity. In this way, a related operation is executed according to a click frequency and/or click intensity, and it no longer needs to perform precise touch input on a virtual keyboard or a virtual button of a touchscreen. Therefore, even in a dark environment or in case of emergency, effective touch input can still be performed on a wireless handheld device whose touchscreen is in a locked state, so that it is greatly convenient for a user of the wireless handheld device.

In addition, the setting of touch input may be setting only a click frequency, or setting only click intensity, or setting both a click frequency and click intensity as described in this embodiment. Setting, inputting, and matching steps in a case that only a click frequency or click intensity is set are similar to those in this embodiment, which are described herein again.

Figure 4:
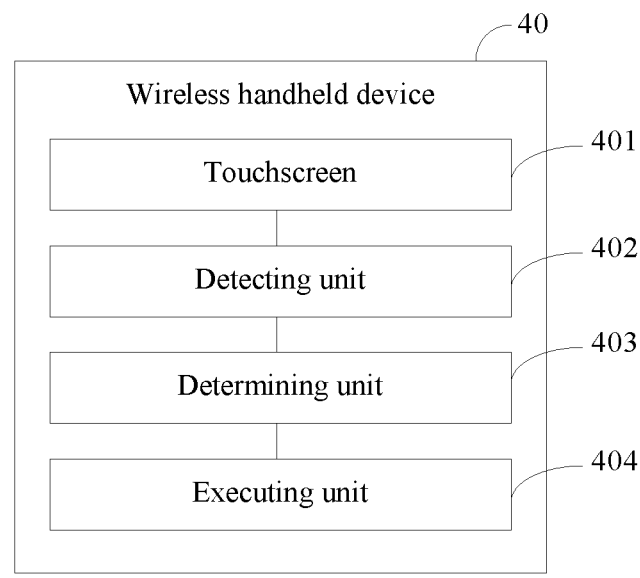
FIG. 4 is a schematic structural diagram of a wireless handheld device according to an embodiment of the present invention.

As shown in FIG. 4, a wireless handheld device 40 provided in an embodiment of the present invention includes:

a touchscreen 401, configured to receive a click operation;

a detecting unit 402, configured to detect an input combination that is of a click frequency and/or click intensity and is received when the touchscreen 401 is in a locked state;

a determining unit 403, configured to determine whether the input combination that is of the click frequency and/or the click intensity, is received when the touchscreen 401 is in the locked state, and is detected by the detecting unit 402 matches a pre-stored input combination of a click frequency and/or click intensity, where the pre-stored input combination of the click frequency and/or the click intensity is corresponding to an operation; and an executing unit 404, configured to, when the determining unit 403 determines that the matching succeeds, execute the operation corresponding to the pre-stored input combination that is of the click frequency and/or the click intensity and is matched by the determining unit 403.

The wireless handheld device provided in the embodiment of the present invention detects an input combination that is of a click frequency and/or click intensity and is received when a touchscreen is in a locked state; and when it is detected that the received input combination of the click frequency and/or the click intensity matches a pre-stored input combination of a click frequency and/or click intensity, where the pre-stored input combination of the click frequency and/or the click intensity is corresponding to an operation, executes the operation corresponding to the matched pre-stored input combination of the click frequency and/or the click intensity. In this way, a related operation is executed according to a click frequency and/or click intensity, and it no longer needs to perform precise touch input on a virtual keyboard or a virtual button of a touchscreen. Therefore, even in a dark environment or in a case of emergency, effective touch input can still be performed on a wireless handheld device whose touchscreen is in a locked state, so that it is greatly convenient for a user of a touch apparatus.

Figure 5:
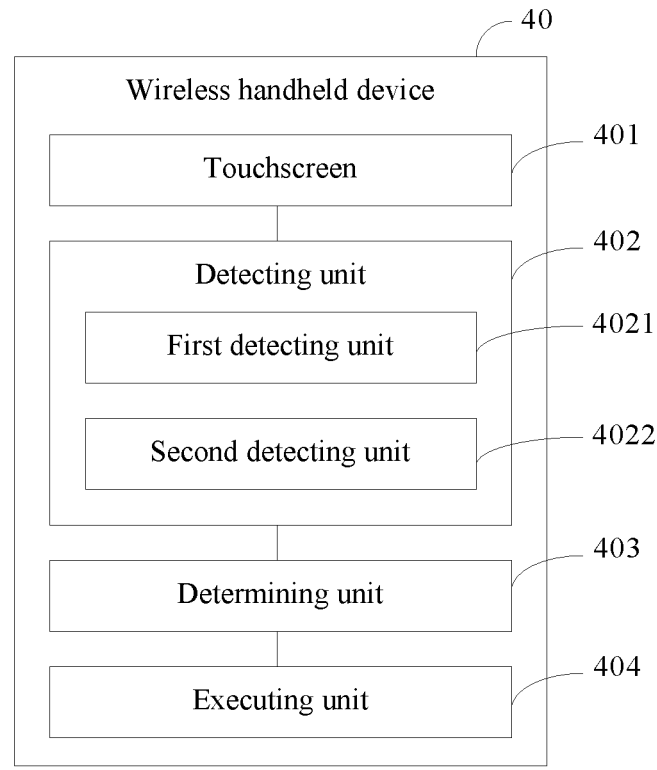
FIG. 5 is another schematic structural diagram of a wireless handheld device according to an embodiment of the present invention.

Further, as shown in FIG. 5, the detecting unit 402 includes at least one of the following units:

a first detecting unit 4021, configured to detect an input combination that is of a click frequency and/or click intensity and is received at preset one or more positions when the touchscreen is in the locked start; or a second detecting unit 4022, configured to detect an input combination that is of a click frequency and/or click intensity and is received at any one or more positions when the touchscreen is in the locked state.

No requirement may be imposed on a position where a user clicks the touchscreen, which is different from a case in the prior art that the user has to touch a specified position. In a dark ambient environment or in case of emergency, a related operation can be performed quickly and a success rate is larger.

In addition, the foregoing operation includes at least one of the following: starting one or more application programs, pausing one or more application programs, closing one or more application programs, starting one or more menus, closing one or more menus, unlocking a touchscreen, entering one or more function interfaces, exiting one or more function interfaces, setting a parameter of a mobile phone, setting a mode of a mobile phone, and setting a function of a mobile phone.

Figure 6:
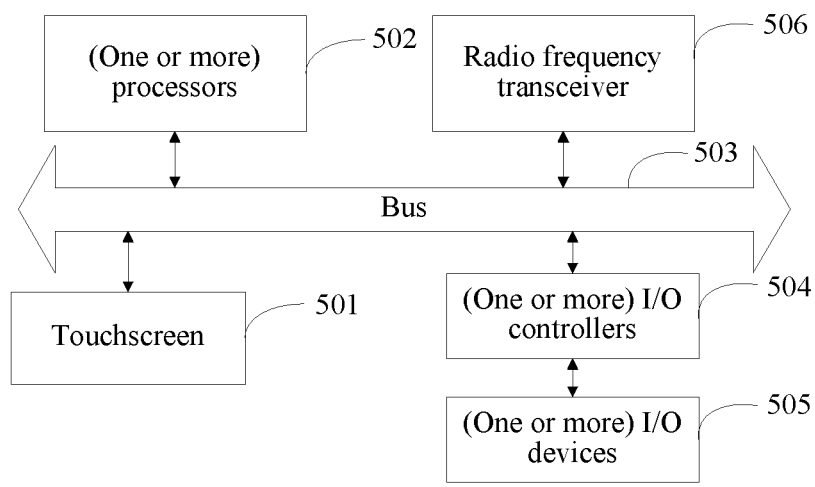
FIG. 6 is another schematic structural diagram of a wireless handheld device according to an embodiment of the present invention.

FIG. 6 is a schematic structural diagram of a wireless handheld device according to an embodiment of the present invention. The wireless handheld device may include: at least one touchscreen 501 and a processor 502, which are coupled with each other through a bus 503.

Optionally, the wireless handheld device may further include one or more input/output controllers 504 coupled to another component through the bus, and the one or more input/output controllers 504 are also coupled to the bus 503 so as to provide an interface for one or more input/output devices 505. Optionally, the wireless handheld device may further include a radio frequency transceiver 506 coupled to another component through the bus. The bus 503 may include one or more buses connected to each other through various bridges, controllers, and/or adapters well known in the art. The input/output device 505 may include a key area, a keyboard, or a cursor controller.

A wireless handheld device provided in an embodiment of the present invention includes:

a touchscreen 501; and at least one processor 5032, coupled to the touchscreen 501 and a memory 502, where the processor 5032 is configured to detect an input combination that is of a click frequency and/or click intensity and is received when the touchscreen 501 is in a locked state; and when it is detected that the input combination that is of the click frequency and/or the click intensity and is received when the touchscreen 501 is in the locked state matches an input combination of a click frequency and/or a click intensity, where the input combination of the click frequency and/or the click intensity is corresponding to an operation and is pre-stored by the memory 502, execute the operation corresponding to the matched pre-stored input combination of the click frequency and/or the click intensity.

Further, the processor 502 is further configured to detect an input combination that is of a click frequency and/or click intensity and is received at preset at least one position or any at least one position when the touchscreen 501 is in the locked state.

In addition, the foregoing operation includes at least one of the following: starting one or more application programs, pausing one or more application programs, closing one or more application programs, starting one or more menus, closing one or more menus, unlocking a touchscreen, entering one or more function interfaces, exiting one or more function interfaces, setting a parameter of a mobile phone, setting a mode of a mobile phone, or setting a function of a mobile phone.

The wireless handheld device provided in the embodiment of the present invention detects an input combination that is of a click frequency and/or click intensity and is received when a touchscreen is in a locked state; and when it is detected that the received input combination of the click frequency and/or the click intensity matches a pre-stored input combination of a click frequency and/or click intensity, where the pre-stored input combination of the click frequency and/or the click intensity is corresponding to an operation, executes the operation corresponding to the matched pre-stored input combination of the click frequency and/or the click intensity. In this way, a related operation is executed according to a click frequency and/or click intensity, and it no longer needs to perform precise touch input on a virtual keyboard or a virtual button of a touchscreen. Therefore, even in a dark environment or in a case of emergency, effective touch input can still be performed on a wireless handheld device whose touchscreen is in a locked state, so that it is greatly convenient for a user of a touch apparatus.

A person of ordinary skill in the art may understand that all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as a ROM, a RAM, a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the claims.

What is claimed is:

1. A triggering method, comprising:
   detecting an input including one of a click frequency and a click intensity at any position on a touchscreen while the touchscreen is in a locked state;
   determining the input detected at said any position on the touchscreen as an input combination to execute an operation by unlocking the touchscreen when the input including the one of the click frequency and the click intensity is received during a preset period of time while the touchscreen is in the locked state; and
   executing the operation corresponding to a pre-stored input combination when the input detected is determined as the input combination that is mapped to the pre-stored input combination which includes one of a click frequency and a click intensity corresponding to the operation,
   wherein the operation is other than an operation of unlocking the touch screen and the operation comprises at least any one of the following: starting one or more application programs, pausing one or more application programs, closing one or more application programs, starting one or more menus, closing one or more menus, entering one or more function interfaces, exiting one or more function interfaces, setting a parameter of a mobile phone, setting a mode of a mobile phone, and setting a function of a mobile phone.

2. The method according to claim 1, wherein a pre-stored click frequency corresponding to the operation is one or more numerical intervals; and pre-stored touchscreen clicking intensity corresponding to the operation is one or more numerical levels of intensity.

3. The method according to claim 1, wherein the determining the input detected as the input combination comprises:
   detecting whether the input combination is received at one position when the touchscreen is in the locked state; or
   detecting whether the input combination is received at any one or more positions when the touchscreen is in the locked state.

4. A wireless handheld device, comprising:
   a touchscreen; and
   at least one processor, coupled to the touchscreen, wherein the processor is configured to:
      detect an input including one of a click frequency and a click intensity at any position on the touchscreen while the touchscreen is in a locked state;
      determine the input detected at said any position on the touchscreen as an input combination to execute an operation by unlocking the touchscreen when the input including the one of the click frequency and the click intensity is received during a preset period of time while the touchscreen is in the locked state,
      execute the operation corresponding to a pre-stored input combination when the input detected is determined as the input combination that is mapped to the pre-stored input combination which includes one of a click frequency and a click intensity corresponding to the operation;
   wherein the operation is other than an operation of unlocking the touch screen and the operation comprises at least any one of the following: starting one or more application programs, pausing one or more application programs, closing one or more application programs, starting one or more menus, closing one or more menus, entering one or more function interfaces, exiting one or more function interfaces, setting a parameter of a mobile phone, setting a mode of a mobile phone, and setting a function of a mobile phone.

5. The wireless handheld device according to claim 4, wherein the processor is further configured to detect whether the input is received at least at one position or any one or more positions when the touchscreen is in the locked state.

* * * * *